United States Patent [19]
Arranaga et al.

[11] Patent Number: 6,133,411
[45] Date of Patent: Oct. 17, 2000

[54] SLURRY MIXTURE FORMING AN ADDITIVE FOR PRODUCING A HYDRODYNAMIC DRAG REDUCTION AQUEOUS POLYMER SOLUTION

[75] Inventors: Alexander B. Arranaga; William D. White, both of Pasadena, Calif.

[73] Assignee: The United States of America as represented by the Secretary of the Navy, Washington, D.C.

[21] Appl. No.: 04/568,055

[22] Filed: Jul. 26, 1966

[51] Int. Cl.⁷ .................................................... C08G 59/68
[52] U.S. Cl. ............................................ 528/413; 528/487
[58] Field of Search .................................... 260/29.7 EM, 260/30.4 N, 33.2; 252/316; 528/413, 487

[56] References Cited

U.S. PATENT DOCUMENTS 2,946,760  7/1960  DeWitt et al. ........................ 260/30.4
3,116,187  12/1963  Scanlone et al. ........................ 149/74
3,163,619  12/1964  Sheats et al. ........................ 260/30.4

*Primary Examiner*—Peter A. Nelson
*Attorney, Agent, or Firm*—Harvey Fendelman; Michael A. Kagan; M. F. Oglo

[57] ABSTRACT

A slurry mixture comprising a water soluble resin of the polyacrylamide class of polymers suspended as a gel in a non-solvent to the resin, but itself water soluble, from a group consisting of (a) the glycol ether type of compounds, or (b) the Tris (tetrahydrofurfuryl) phosphate type containing the tetrahydrofurfuryl ring.

1 Claim, No Drawings

SLURRY MIXTURE FORMING AN ADDITIVE FOR PRODUCING A HYDRODYNAMIC DRAG REDUCTION AQUEOUS POLYMER SOLUTION

The invention described herein may be manufactured and used by or for the Government of the United States of America for governmental purposes without the payment of any royalties thereon or therefor.

This invention relates to a slurry mixture containing a water soluble polymer. More particularly, it relates to such a slurry mixture which is of special utility as a fast solvation additive to water to produce a dilute polymer aqueous solution for use in the technique of reduction of hydrodynamic drag disclosed in the copending application of A. G. Fabula et al, entitled "Torpedo Drag Reduction Employing Polymer Ejection," Ser. No. 441, 002, filed Mar. 17, 1965.

The operation and utility of the slurry mixture is illustrated by the polymer aqueous solution ejection system disclosed in the above referenced copending application, wherein it would be used as the additive dispensed into the inducted seawater in the mixer device therein. In such application it is highly important that the slurry mixture does not lose its fluidity through evaporation, under the conditions of prolonged storage and repeated exposure to air, inherent to the logistic and operational environment of naval torpedoes. It is also very important that the particles of polymer material remain in stable homogenously dispersed condition of suspension (i.e. non-settling) throughout storage.

It is therefore an object of this invention to provide a polymer-containing slurry mixture for use as an additive in hydrodynamic drag reduction systems which exhibits good storage stability in its characteristics of fluidity.

Another object is to provide a slurry mixture in accordance with the previous objective which possesses good storage stability in its characteristic of the polymer material remaining in homogenous suspension.

In accordance with this invention, the above and other objects are realized by forming a slurry mixture from a composition comprising a high molecular weight, water soluble resin of the polyacrylamide class of polymers suspended as a gel in a liquid which is non-solvent to the resin, but is itself soluble or miscible in water, from a group consisting of: (a) the glycol ether type of compounds; or (b) the type of compounds containing the tetrahydrofurfuryl ring. The content of the resin is approximately one-fourth to one-half the total weight of ingredients.

Any one of several commercially available polyacrylamide resins can be used in the invention. A preferred resin is one with a molecular weight greater than one million and having the following chemical group as the basic repeating unit in its molecular structure:

$$\left[ \begin{array}{c} -CH_2-CH- \\ | \\ C \\ / \quad \backslash\!\!\!= \\ NH_2 \quad\quad O \end{array} \right]_n$$

where n is an integer greater than one. An example is Nalcolyte D1940A, produced by the Nalco Chemical Co. The physical form, as used in the invention, is as a powder of subsieve particle size (i.e., smaller than 400 mesh) and preferably having an average particle size of approximately 10 microns. This small particle size promotes stability of the suspension, and given suitable agitation, enables rapid solvation or hydration of the polymer material in producing aqueous polymer solutions The non-solvent liquid vehicle is a water soluble liquid selected for its low flammability (i.e., flash point, open cup, over 70° C.), its slow evaporation rate (i.e. high boiling point: over 150° C.), and its low freezing point (lower than −50° C.). The preferred non-solvent liquids of the invention are butyl cellosolve, a form of glycol ether, and tris (tetrahydrofurfuryl) phosphate. The Glycol ether and tetrahydrofurfuryl chemical groups have the following formulas, respectively:

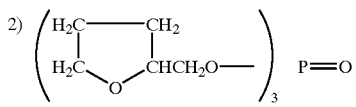

In order to obtain a stable suspension of the polyacrylamide resin in the liquid carrier it is necessary to thicken, or gel, the liquid with a finely powdered material sometimes referred to as a gellant or gelling agent. The preferred gelling agents of the invention are selected from: (a) the group of clay-like organic derivatives of silicate minerals marketed under the trade name Bentone by the National Lead Co.; and (b) the copolymers of methyl vinyl ether and maleic anhydride produced by the General Aniline and Film Corp. under the trade name Gantrez AN. A combination of Bentone 27, Bentone 11 and propylene carbonate is the preferred gelling agent for butylcellosolve, the propylene carbonate serving as a promoter which polarizes the butyl cellosolve in a way which enhances effective gelling. Where the tetrahydrofurfuryl compound is used as the liquid vehicle, either the Bentones or Gantrez AN-119 may be used for thickening the liquid. In the latter case a small amount of 2-amino-2-methyl-1,3-propanediol (AMPD) is added to serve as a cross-linking agent to enhance gelling. Bentone 27 is otherwise known as an organic compound derived from cation exchange reactions between organic bases and the clay mineral montmorillonite, and Bentone 11 is otherwise known as a similarly produced organic derivative of the clay mineral hydrous magnesium aluminum silicate. The resulting compounds are formed by replacing the inorganic cations of the clay mineral lattice with organic cations, and have the property of forming thixotropic gels in organic liquids.

The compositions of slurry mixtures, in accordance with this invention, are illustrated in greater detail in examples which follow, but it is to be understood that the examples merely typify and do not set forth the definitive limits of the invention which have been set forth herein above.

EXAMPLE I

A slurry mixture may be formulated having the following preferred percentage ranges of ingredients:

|  | Percentage Range (Wt.) |
|---|---|
| Nalcolyte D1940A, dried | 35–45 |
| Butyl cellosolve | 57–49 |
| Bentone 27 | 4–2 |
| Bentone 11 | 0.5–1.5 |
| Polylene carbonate | 1.5–2.0 |
| Wetting agent | 0.5–1.5 |

The Nalcolyte D1940A, vacuum-dried at 65° to 75° C. for several hours, is dispersed in butyl cellosolve by the following procedure. Propylene carbonate and the wetting agent are dissolved in the butyl cellosolve. Then Bentone 27 and Bentone 11 are thoroughly dispersed in the resulting solution with the aid of heat (65° to 75° C.). Next the Nalcolyte D1940A is mixed in slowly, while the mixture is still being warmed. Finally the resulting slurry is subjected to high speed mixing (e.g., Waring blender at 15,000 rpm) for approximately 5 minutes A preferred wetting agent in the Bentone-gelled composition above is an organo-silicone copolymer produced by the Union Carbide Corporation, under the designation L-530.

EXAMPLE II

Another formulation of slurry mixture contains the following preferred percentage ranges of ingredients:

|  | Percentage Range (Wt.) |
| --- | --- |
| Nalcolyte D1940A, dried | 28–33 |
| Tris(tetrahydrofurfuryl) phosphate (THFP) | 67–62 |
| Gantrez AN-119 | 1–2 |
| 2-amino-2 methyl-1, 3-propanediol (AMPD) | 0.5–1.5 |
| Alkyl naphthalene sodium sulfonate | 2–3 |

Dispersion of the Nalcolyte D1940A in tris (tetrahydrofurfuryl) phosphate is accomplished as follows. The alkyl naphthalene sodium sulfonate wetting agent is dissolved in the THFP, with heating if necessary. Then the Gantrez AN-119 and AMPD are dispersed in the resulting solution at a temperature of 95° to 105° C., with heating continued for a period of several minutes up to one-half hour. The temperature is then lowered to 70° to 80° C. and the Nalcolyte D1940A mixed in thoroughly. The resulting slurry is then subjected to high-speed mixing. Agglomerates, if present, can be removed by passing through a fine mesh screen. It is to be noted that where tris(tetrahydrofurfuryl) phosphate is used, its high density and viscosity do not allow as much Nalcolyte D1940A to be suspended (on weight percent basis) as where butyl cellosolve is used.

Test Utilized to Determine Effectiveness as a Drag Reduction Agent

The effectiveness of the slurry mixtures of this invention as an additive for producing acqueous polymer solutions for hydrodynamic drag reduction is measured by the apparatus disclosed in the copending application of J. W. Hoyt entitled "Turbulent Friction Measurement," Ser. No. 456,579, filed May 17, 1965. This apparatus flows a test specimen of a fluid through a thin conduit at a given flow rate under conditions which assure fully developed turbulent flow therealong, a pair of spaced pressure sensing stations being provided along the conduit. What is obtained by use of this apparatus is a quantitative figure of merit, representing the turbulent flow drag properties of the specimen of fluid relative to that of distilled water. This figure of merit, denoted by the alphabetic letter A, and expressed as a percentage, is obtained from test measurements made with use of the apparatus and by calculation in accordance with the following formula:

$$A \text{ (percentage)} = 1 - {}^B/_C(100)$$

wherein

B=the measured average pressure differential between the two stations for the specimen, and C=the corresponding pressure differential for distilled water.

Test results for an aqueous solution containing various concentrations of an Example I type slurry mixture formulated with 40.0% Nacolyte and 53.5% Butyl Cellosolve, are as follows:

| Concentration of slurry mixture in test specimen (Wt-ppm) | Fig. of merit A, representing turbulent flow drag properties relative to distilled water (%) |
| --- | --- |
| 5 | 27.4 |
| 10 | 44.2 |
| 15 | 56.8 |
| 20 | 64.7 |
| 30 | 67.9 |

The terms and expressions which are employed in this specification are used as terms of description and not of limitation, and there is no intention in the use of such terms and expressions of excluding any equivalents of the features shown and described or portions thereof.

Obviously many modifications and variations of the present invention are possible in the light of the above teachings. It is therefore to be understood that within the scope of the appended claims the invention may be practiced otherwise than as specifically described.

What is claimed is:

1. A slurry mixture for use as an additive for producing an aqueous turbulent flow drag reduction polymer solution, said mixture made from ingredients comprising;

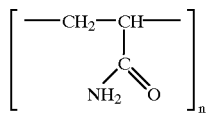

| Tris (tetrahydrofurfuryl) phosphate | 67–62 |
| --- | --- |
| Copolymers of methyl vinyl ether and maleic anhydride | 1–2 |
| 2-amino-2 methyl-1, 3-propanediol | 0.5–1.5 |
| Wetting agent | 0.5–3.0 |

* * * * *